United States Patent [19]

McRae et al.

[11] Patent Number: 4,887,920
[45] Date of Patent: Dec. 19, 1989

[54] PUNCTUATION CHECK FEATURE FOR AN ELECTRONIC TYPEWRITER

[75] Inventors: Doris J. McRae, Danbury, Conn.; Richard E. Roberts, Cortland, N.Y.

[73] Assignee: Smith Corona Corporation, Cortland, N.Y.

[21] Appl. No.: 141,030

[22] Filed: Jan. 5, 1988

[51] Int. Cl.⁴ .................................................. B41J 5/30
[52] U.S. Cl. ........................................ 400/63; 400/7; 400/697.1; 364/900
[58] Field of Search ............... 400/7, 63, 64, 74, 83, 400/314, 315, 317.3, 697.1; 364/900

[56] References Cited

U.S. PATENT DOCUMENTS

| | | | |
|---|---|---|---|
| 4,181,972 | 1/1980 | Casey | 400/7 X |
| 4,354,765 | 10/1982 | Buchanan et al. | 400/7 |
| 4,574,363 | 3/1986 | Carlgren et al. | 400/7 X |
| 4,655,620 | 4/1987 | Adams et al. | 400/83 X |
| 4,674,065 | 6/1987 | Lange et al. | 400/74 X |
| 4,678,351 | 7/1987 | Curley | 400/7 X |

OTHER PUBLICATIONS

IBM Technical Disclosure Bulletin, "Method to Define Punctuation Format and Begin/End Punctuation Format", vol. 29, No. 3, Aug. 1986, pp. 1142-1143.

Primary Examiner—Ernest T. Wright, Jr.

[57] ABSTRACT

An electronic typewriter having a punctuation checking feature checks each punctuation feature as it is stored in a memory section, against a set of predetermined rules which define punctuation errors in terms of the context of the punctuation mark. If the punctuation mark does not agree with the defined rules, a suitable alarm, such as a visual and/or audible signal is given to the typist. A plurality of algorithms form the basis for sub-routines which a microprocessor can execute to determine if any of the rules are violated. The punctuation of a complete file can be checked by calling out each character in the file, from beginning to end and applying the checking procedure.

12 Claims, 2 Drawing Sheets

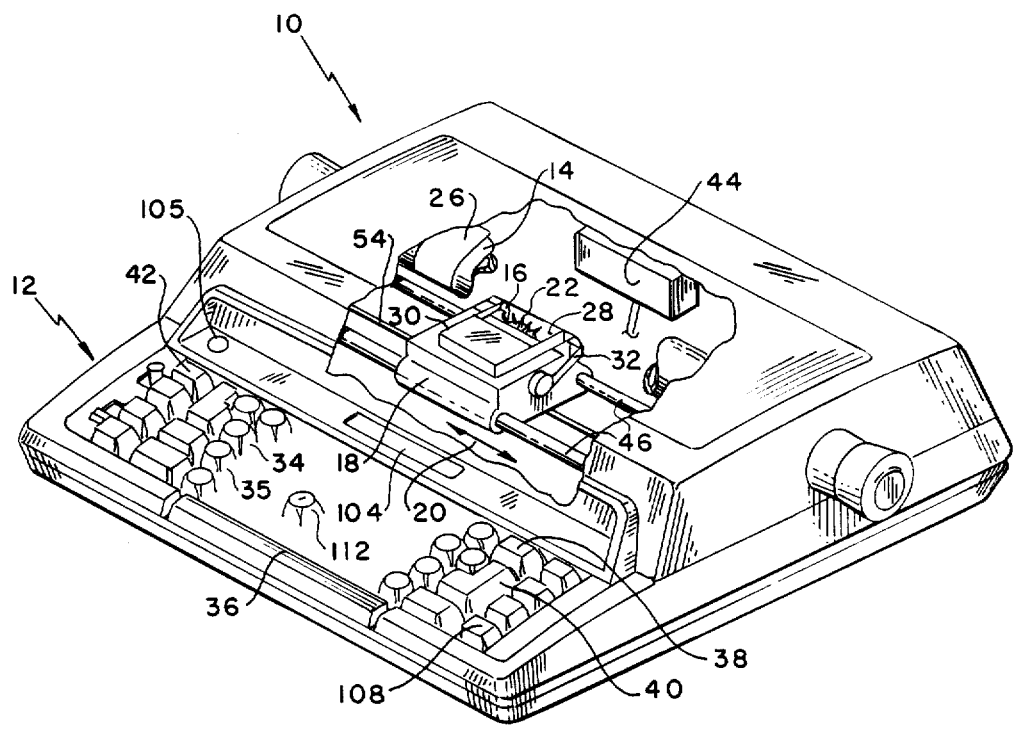
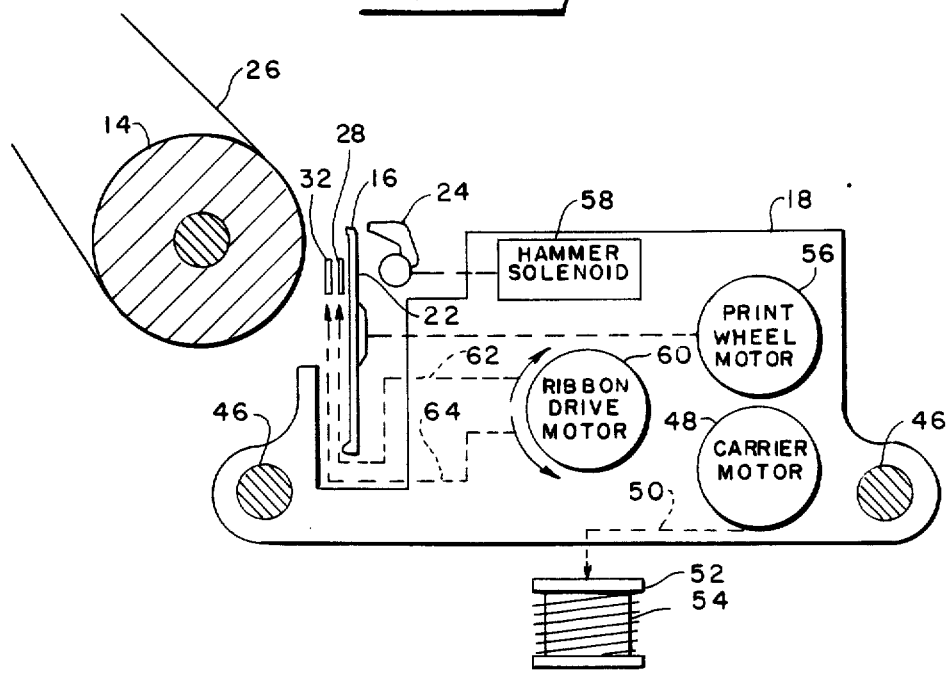

PUNCTUATION CHECK FEATURE FOR AN ELECTRONIC TYPEWRITER

BACKGROUND OF THE INVENTION

1. Field of the Invention

This invention relates to a punctuation checking system for an electronic typewriter. More particularly, this invention relates to a feature for electronically finding a punctuation error.

2. Prior Art

Typewriter manufacturers are continually developing error detection and/or correction systems to facilitate the task of correcting errors. Electronics in typewriters have promoted error detection and/or correction capabilities in that the typewriter is afforded the ability to "remember" the last plurality of printed characters which can be automatically recalled from memory for correction purposes. For example see U.S. Pat. No. 4,655,620, Adams et al, entitled Spelling Error Finding Features Including an Electronic Spelling Dictionary. Such a self correcting system has made the task of erasing characters simpler by providing a correction key that eliminates the burden of actuating the character key of the unwanted character.

SUMMARY OF THE INVENTION

An electronic typewriter with a memory included therein is operable to detect a punctuation error at the time the error is made in response to typing operations. When a punctuation error is detected, an error bit (code signal) is automatically added to a code memory register corresponding to the print position of the error. The code memory register is operable to store code information for each print position. Also, when the error is detected, the electronics produces an audible warble to inform an operator that a printed error has occured. A visual indicator such as an LED is also activated.

The electronic typewriter is also operable to automatically reposition a print hammer of a printing mechanism to the error position from a position beyond the error by the electronics searching for and finding any error bits added to code memory registers. This is accomplished by the operator performing a keyboard actuation for finding the error. When the print hammer of the printing mechanism has been located at the position of the error, the operator has a choice of erasing or not erasing the error or the word containing the error. Instead of erasing an error, the operator may be able to add or delete a character at some location within the printed word to correct the spelling error.

The system for finding an error defined by the present invention is equally as useful when installed in an electronic typewriter having a combination of an electronic spelling dictionary feature and a character display unit. The character display unit can be either built into the typewriter, such as a conventional 16 character display unit, or a CRT unit of a word processing system. When operating the typewriter in a mode for entering characters in the character display unit instead of printing on a work sheet, an error bit (code signal) is automatically added to a code memory register when an error has been detected. The feature detects the error at the time the error is made in response to keyboard entries. A find pointer (e.g. display cursor) automatically moves to the position of the error from a position beyond the error by the electronics searching and finding the error bit added to the code memory register. This is accomplished by the operator actuating a key or a multiple key sequence for finding the error. When the find pointer finds the error, the operator has a choice of erasing or not erasing the error. Instead of erasing an error, the operator may be able to add or delete a character at some location within the displayed word to correct the error.

When checking proper punctuation was proposed for implementation in a typewriter, many problems become immediately apparent. Prior arrangements here included a limited punctuation check, which would check that a word was capitalized if it followed a period and two spaces. This was very limited as it did not even take into account a period followed by a carriage return.

The English language is such that for every rule, there is an exception. This is especially true when it comes to punctuation. Not only are there exceptions to most punctuation rules, but the punctuation marks themselves are used for other purposes. For example, a period is not only used to end a sentence, it is also used to end an abbreviation or as a decimal point in a number.

The first task was to identify a set of punctuation rules that had no (or limited) exceptions. This was done by references to secreterial manuals and books of style. Then the vague and ambiguous rules (see the following list) had to be translated into definite rules and algorithms that could be implimented in software. In addition, those exceptions and conditions that could cause problems had to be identified. For example, even though the first rule states that a period must be followed by two spaces, a carriage return, tab, or several other characters are equally valid and failure to take them into account would seriously affect the usefulness of the feature.

In order to make the feature as simple yet efficient as possible, the checks are implemented as a set of tests of surrounding characters. Therefore, when a particular punctuation mark is detected, the characters surrounding it are checked according to the algorithms developed. Since it would be impossible to look ahead when the typist is entering text, the punctuation check is limited to scanning of existing text in memory files.

Accordingly, an object of this invention is to provide an electronic typewriter with a feature for conveniently and efficiently finding one or more punctuation errors either printed or shown on a character display unit.

Other objects, features and advantages of the invention will become more apparent from the following description, including appended claims and accompanying drawings.

BRIEF DESCRIPTION OF THE DRAWINGS

FIG. 1 is an isometric frontal view of an electronic typewriter sectioned to show components operated according to the teachings of the present invention.

FIG. 2 is a schematic side view of a print carrier and a platen of the electronic typewriter of FIG. 1.

DETAILED DESCRIPTION OF THE INVENTION

Figure 3:
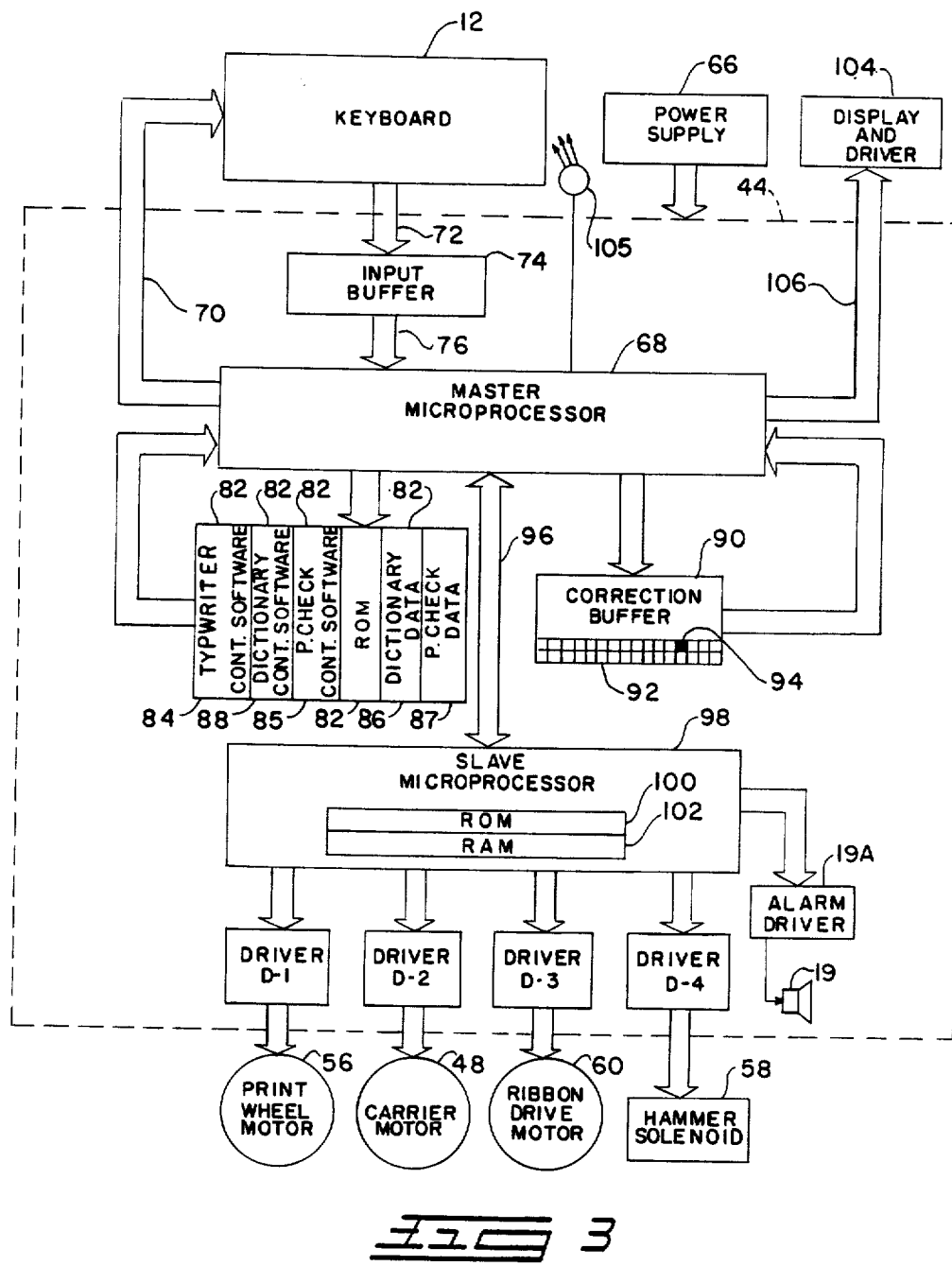
FIG. 3 is a block diagram of the electronics for controlling functional operations of the typewriter including the punctuation check feature.

An electronic correcting typewriter 10 according to the invention is shown in FIG. 1. Generally, an electronic typewriter 10 comprises a keyboard 12, a platen 14, a print wheel 16 and a carrier 18 mounted in the typewriter 10 for left and right horizontal movement along platen 14 as indicated by arrow 20.

Print wheel 16, also known as a "daisy" wheel, has a plurality of radial petals or spokes 22, each supporting a respective character of the keyboard 12. A print hammer 24 (FIG. 2) is positioned adjacent to print wheel 16 for striking an aligned petal 22 against a sheet of paper 26 or other recording medium supported on platen 14.

A print ribbon mechanism includes an exposed portion of inked ribbon 28 extenting from a cartridge 30 which is mounted on the carrier 18. Carrier 18 also supports a correction mechanism including a correction ribbon 32. Inked ribbon 28 may be inked fabric or carbon film type of ribbon and correction ribbon 32 may be of a type having a coating of adhesive or white overlay material for making lift-off or cover-up corrections.

Keyboard 12 contains the usual plurality of character keys 34 and carrier control function keys including a spacebar 36, a backspace key 38, a carrier return key 40 and a code key 42. Upon actuation of any key on keyboard 12, a respective keyboard output signal is communicated to an electronic control circuit 44 (FIG. 3) which has various outputs controlling functions and operations of typewriter 10, principally, operation of the printwheel 16 and other components assembled on carrier 18.

More specifically, when a character key 34 is depressed to print, e.g., key 35 representing the letter "a", a unique signal representative of that character is communicated to control circuit 44 which in turn generates appropriate commands for (1) rotating the printing wheel 16 to bring the selected character petal 22 upright, (2) lifting the print ribbon 28 between the petal 22 and the sheet of paper 26, and (3) actuating the print hammer 24. The letter "a" will thus be imprinted over print ribber 28 onto paper 26.

Further, when the spacebar 36 is depressed, a unique signal representing a forward "space" move to the right is communicated to control circuit 44 which in turn controls the carrier 18 to move forward one character position without printing. In a similar manner, carrier 18 is controlled to move backwards one character position in response to actuation of the backspace key 38. When the carrier return key 40 is actuated, the carrier 18 is caused to move leftwardly to the position of the left margin or stop setting and the paper 26 is indexed or fed upwardly for exposing a fresh print line.

FIG. 2 shows a schematic diagram of the principal mechanisms assembled on carrier 18 and their relationship to platen 14. The showing of FIG. 2 is schematic only in order to facilitate an understanding.

As previously mentioned, carrier 18 is able to move horizontally to the left and right as indicated by arrow 20 on FIG. 1. Carrier 18 is supported to slide on guide rails 46 fixedly mounted to extend parallel to platen 14. A carrier motor 48 is coupled by a mechanical linkage, schematically represented by a broken line 50, to rotatively drive a cable pulley 52. A cable 54 is wound about pulley 52 in a manner permitting simultaneous winding and unwinding. The cable 54 is fixedly anchored to the typewriter 10 to prevent movement of the cable 54 in the direction of the carrier movement. Carrier motor 48 is operated under control of control circuit 44 for causing carrier 18 to move to the left or to the right along the platen 14 by the pulley 52 winding and unwinding along the fixedly anchored cable 54.

Print wheel 16 is operated by a print wheel motor 56 so that any radial petal 22 can be rotatively brought upright for printing. Print wheel motor 56 is also operated under control of control circuit 44. After the selected character petal 22 is located upright, hammer 24 is fired by a connected hammer solenoid 58 also under control of the control circuit 44. The upright petal 22 is deflected by the propelling hammer 24 to strike against the paper 26 on the platen 14 for either printing over print ribbon 28 or erasing over correction ribbon 32 when typewriter 10 is operated in correction mode.

The ribbons 28, 32 are operated by a ribbon drive motor 60 under control of the control circuit 44. A mechanical linkage, schematically represented by broken line 62, couples the ribbon drive motor 60 to operate print ribbon 28 and a mechanical linkage 64 is connected from the ribbon drive motor 60 to enable operation of the correction ribbon 32. The ribbon drive motor 60 operates one ribbon when driven in one direction and operates the other ribbon when driven in the other direction. For example, when the ribbon drive motor 60 is powered clockwise, the print ribbon 28 is raised and, when the ribbon drive motor 60 is operated in correction mode to rotate counterclockwise, the correction ribbon 32 is raised as is illustrated in FIG. 2.

The block diagram of FIG. 3 provides an overall view of the control circuitry 44 used for implementing the punctuation check feature of the present invention. A power supply 66 is connected to supply the electric power necessary to operate the various electronic components in control circuitry 44. As is shown in FIG. 3, keyboard 12 communicates with a known master microprocessor 68 as a result of an equally known interrupt technique issued periodically (e.g. every 7 milliseconds) on bus line 70. Master microprocessor 68 is a known electronic component, such as, the 8031 made by Intel Corporation of Santa Clara, Calif. As a result of the interrupt, the keyboard 12, and, more particularly, the matrix arrangement of keys is scanned to detect any key actuation. A logic code signal representative of a key actuation appears on bus line 72 extending to an input buffer 74. Keyboard signals are temporarily stored by the input buffer 74 in the order of keyboard input. Master microprocessor 68 receives data from input buffer 74 via bus line 76. The input buffer 74 is a hex non-inverting buffer, such as a CD 4503 manufactured by National Semiconductor of Santa Clara, Calif.

Master microprocessor 68 is associated with external electronics including a ROM unit 82 for controlling operation of master microprocessor 68. Included in ROm unit 82 is typewriter control software 84, dictionary data 86 comprising character codes forming a list of words and dictionary and punctuation check control software 85. Also shown is a random access punctuation check data storage 87. A correction buffer 90 is operatively associated with master microprocessor 68 and includes a stack of memory cells or code memory registers 92 for storing code information of selected characters processed by master microprocessor 68. The correction buffer 90 is addressable by a display cursor 94 or a find pointer 94 (shown solid), located at one register 92 corresponding to the current location of carrier 18. In this regard the character of the current carrier 18 position can be recalled from correction buffer 90 for correction purposes. Find pointer 94 progressively moves through the stack of memory registers 92 in conjunction with movement of carrier 18 so that one register 92 has character information of a related one character position along platen 14. A 4096 bit (1024×4 bits) static RAM identified as 2114 preferably comprises correction buffer 90.

A character code signal ready for typewriter processing is sent along line 96 (output channels) from master microprocessor 68 to a further microprocessor 98 which is slaved with respect to microprocessor 68 as master. Slave microprocessor 98 (e.g. the 8051 also made by Intel and identical to the 8031 except for program memory) has an internal program stored in ROM (4K×8 read only memory) 100 and the code data being stored in a RAM (128×8) 102. Code data is read from RAM 102 as necessary for the program in ROM 100 to develope, in known fashion, the control and drive signals for operational control of the various elements of carrier 18 namely, printwheel motor 56, carrier motor 48, ribbon drive motor 60 and hammer solenoid 58.

The dictionary control software 88 compares character code signals for each character entered from the keyboard 12 with character code signals forming the list of words in the dictionary data 86 and punctuation check data 87 for detecting punctuation or spelling errors. When a punctuation or spelling error is detected, the control circuit 44 provides an audible warble (this is accomplished by audible sound device 19 driven by alarm 19A as shown in FIG. 3) to inform the operator that an error has occurred. An LED visual signal 105 will also indicate an error. Also when an error is detected, an error bit (code signal) is added to the code memory register 92 in the correction buffer 90 corresponding to the print position of the spelling error. The purpose for adding an error bit at the print position will be explained below.

External drivers D-1, D-2, D-3 and D-4 are connected to receive code data read from RAM 102 of slave microprocessor 98 for controlling operation of motors 56, 48, 60 and solenoid 58, respectively. Drivers D-1, D-2, and D-3 are conventional quad drivers (e.g. 2069) for decoding the data and for issuing appropriate control signals to connected motors 56, 48, and 60. The drive control signals regulate precise angular rotation and direction of motors 56, 48, and 60. Driver D-1 issues appropriate signals to printwheel motor 56 for rotatably positioning print wheel 16 according to the code generated by one of the character keys 34. Driver D-2 develops the signals necessary for stepping carrier motor 48 to incrementally move carrier 18 through character positions along platen 14, driver D-3 controls the ribbon drive motor 60, such that, print ribbon 28 is operated (via linkage 62) for printing when motor 60 is energized to rotate in one direction (clockwise in FIG. 2) and correction ribbon 32 is enabled (via linkage 64) for erasing when motor 60 is energized to rotate in the opposite (counterclockwise) direction. Typewriter 10 is operating in correction mode when ribbon drive motor 60 is controlled to rotate in the counterclockwise direction enabling ribbon 32. Driver D-4 is in the form of a known kind of electronic latch for controlling operation of hammer solenoid 58 and is timed with respect to the other drivers D-1, D-2 and D-3 such that hammer 24 is actuated after printwheel character selection is made and one of the ribbons 28, 32 is elevated.

The system for finding a punctuation error defined by the present invention is equally as useful when installed in an electronic typewriter having a combination of electronic spelling dictionary feature and a character display unit. A character display unit 104 (FIG. 1) is built into the typewriter 10. This display unit 104 has a commonly used maximum capacity display of sixteen characters. The display unit 104 (FIG. 3) is connected to receive code data from the master microprocessor 68 via bus line 106 for entering characters on the display unit 104.

One method of initializing the operation of the error find feature is to depress a function or code key 108 on the keyboard 12. The function key 108 is dedicated as a single key operation for the present invention. Another method of initializing the operation is to depress a multiple key sequence. The sequence is first depressing the code key 42 and then depressing a find key 112. The find key 112 is a character key 34 representing the letter "F". It is common practice to use a character or number key 34 on the keyboard 12 in combination with a code key 42 to operate a typewriter function other than the specific character or number.

As with most microprocessors, the control circuit 44 of FIGS. 1 and 3 has a regular program idling loop in which it makes rounds or sequential interrogations of the various registers and initiates certain routines or operations according to the status of those registers or flags.

For clarity and ease of description, only the portions of routines relative to the present punctuation check feature are recited in the psuedo code listing.

In the preferred embodiment, punctuation check will check a document in memory for 14 common punctuation errors. The punctuation errors and the algorithms used to detect them will be subsequently described.

Punctuation check will only work in memory mode during a Find operation. If punctuation check is active, the file will be checked for punctuation errors. Scanning of the file is done using Find; The check for mismatched quotes will be done only if, during the scan, the beginning or end of the file is encountered.

Punctuation check may be activated only in memory mode. To activate, press CODE+"X" keys. The punctuation check LED 105 will turn on and the display will indicate "Punctuation Check On". To deactivate, press "CODE+"X" again; the light will go off and the display will indicate "Punctuation Check Off". The Punctuation Check LED 105 will only be on while the typewriter 10 is in memory mode. If the mode is switched, the LED 105 will go off. When the typewriter 10 is switched back to memory mode, the LED 105 will come on. Switching modes does not turn the feature off. As mentioned before, when Punctuation Check is active, punctuation is checked during Find. If a spelling check feature is also active, both punctuation and spelling are checked. Find will terminate with the cursor 94 on the first error encountered.

On each occurrance of a punctuation error, the LED 105 will flash and an audible signal or "beep" will occur.

In the preferred embodiment it is considered an error when the typist:

1. Does not space twice after the end of a sentence (i.e. following an exclamation point, period, question mark),
2. Does not leave one space after a comma or semicolon,
3. Does not leave two spaces after a colon when the next word begins with a capital letter. Otherwise, a colon must be followed by a space unless used in reference to time, as in 8:00 PM,
4. Does not place periods and commas inside quotation marks, 5. Does not place colons and semicolons outside quotation marks,
6. Types a common before a parenthesis,
7. Types a comma after the words: such, as, like,
8. Types a comma before the word "than",
9. Does not leave a space before and after a dash (a dash is defined as two hyphens typed side by side "--"),
10. Types a dash and a comma side by side,
11. Types a dash and a period side by side,
12. Does not close a parenthesis, quotation or bracket,
13. Spaces after an opening parenthesis or bracket or before a closing parenthesis or bracket,
14. Spaces before an apostrophe.

In the following pseudo-code representations of the punctuation check algorithms, the following conventions are used:

The term "character" refers to the character currently being checked in the document. The term "character_pointer" refers to the address of that character.

The procedure "get_pointer_character" returns a value "point "character_pointer" refers to the address of that character.

The procedure "get_pointer_character" returns a value "pointer_character" which is the character at the address of "pointer". This procedures ignores control characters such as Bold On, Auto underline On, etc. and returns the next text character.

The procedure "check_quote" scans the file from the beginning and returns the value "close" if the current quotation mark is the second or other even value from the beginning of the file and the value "open" otherwise. This assumes that quotes are properly matched. If this assumption is not true, those checks which use it cannot be done.

The procedures "next_printable_character" and "previous_printable_character" return the next or previous printable character respectively. A printable character is defined as any alphanumeric character or punctuation mark. Spaces, returns and tabs are not included.

Although not explicitly noted, any error condition completes the procedure and returns to the calling program.

Braces (()) indicate comments. Numbers in parenthesis indicate the rule number. An "s" indicates that the test is a special case of the rule.

The various pseudo-codes for each of the checking subroutines are as follows:

---

(1) PROCEDURE check_period
(when a period is detected, the next character must be a required return (1s), a right parenthesis (1s), a right bracket (1s), is a number (1s), a tab (1s), a quotation mark or a space (1). If a space, the next character must be a required return (1s), a tab (1s), or a space (1). Any other character is an error. the previous character must not be a quotation mark.)
pointer_character_pointer+1 (point to next character)
get_pointer_character
CASE pointer character
required_return: ok (special case of rule 1)
tab: ok (special case of rule 1)
right_parenthesis: ok (special case of rule 1)
right_bracket: ok (special case of rule 1)
number: ok (special case of rule 1)
quotation_mark: ok (rule 4)
space: pointer=pointer+1
get_pointer_character
CASE pointer character
required_return: ok (special case of rule 1)
tab: ok (special case of rule 1)

-continued space: ok (rule 1)
other: error
END CASE
other: error
END CASE
pointer=pointer_1
get_pointer_character
IF pointer_character=quotation mark THEN error ENDIF (rule 4)
END check_period (2) PROCEDURE check_exclamation point
(this procedure is identical to check_period except that the check for a preceding quote is not done, and the mark may not be followed by a number.)
pointer=character_pointer+1 (point to next character)
get_pointer_character
CASE pointer character
required_return: ok (special case of rule 1)
tab: ok (special case of rule 1)
right_parenthesis: ok (special case of rule 1)
right_bracket: ok (special case of rule 1)
quotation_mark: ok (rule 4)
space: pointer=pointer+1
get_pointer_character
CASE pointer_character
required return: ok (special case of rule 1)
tab: ok (special case of rule 1)
space: ok (rule 1)
other: error
END CASE
other: error
END CASE
END check_exclamation_point (3) PROCEDURE check_question_mark
(This procedure is identical to check_period except that the check for a preceding quote is not done, and the mark may not be followed by a number.)
pointer=character_pointer+1 (point to next character)
get_pointer_character
CASE pointer character
required_return: ok (special case of rule 1)
tab: ok (special case of rule 1)
right_parenthesis: ok (special case of rule 1)
right_bracket: ok (special case of rule 1)
quotation mark: ok (rule 4)
space: pointer=pointer+1
get_pointer_character
CASE pointer/character
required_return: ok (special case of rule 1)
tab: ok (special case of rule 1)
space: ok (rule 1)
other: error
END CASE
other: error
END CASE
END check_question_mark (4) PROCEDURE check comma
(When a comma is detected, the next character must be required return (2s), a tab (2s), a space (2), or a quotation mark (13,4). Any other character is an error. The next word may not be "than" (8), and the preceding word(s) may not be "such as" (7) or "like" (7). The next printable character must not be a parenthesis (6) or a bracket (6), either left or right. The preceding character may not be a quotation mark (4).)
pointer=character_pointer+1 (point to next character)
get_pointer_character
CASE pointer_character
required_return: ok (special case of rule 2)
tab: ok (special case of rule 2)
space: ok (rule 2)
quotation_mark: ok (rule 13, rule 4)
other: error
END CASE
pointer=character_pointer−1
get_pointer_character
IF pointer_character=quotation_mark THEN error ENDIF
check_next_word
IF next_work="than" THEN error ENDIF (rule 8)
ELSE check_previous_work
CASE previous_word
"like": error (rule 7)

```
"as": check_previous_word
IF previous_word="such" THEN error (rule 7)
ELSE ok
END CASE
ENDIF
IF next_printable_character=left_parenthesis THEN error
ELSE ok
ENDIF (rule 6)
IF next_printable_character=right_parenthesis THEN error
ELSE ok
ENDIF (rule 6)
IF next_printable_character=left_bracket THEN error
ELSE ok
ENDIF (rule 6)
IF next_printable_character=right_bracket THEN error
ELSE ok
ENDIF (rule 6)
END check_comma
(5) PROCEDURE check_semicolon
(When a semicolon is detected, the next character must be a space
(2), a required return (2s), or a tab (2s). Any other character
is an error.)
pointer=character_pointer+1 (point to next character)
get_pointer_character
CASE pointer_character
space: ok (rule 2)
required_return: ok (special case of rule 2)
tab: ok (special case of rule 2)
other: error
END CASE
END check_semicolon
(6) PROCEDURE check_hyphen
(When a hyphen is detected and the next character is also a hyphen
(forming a dash), the previous character must be a space (9),
a required return (9s) or a tab (9s). Any other character is an
error. If the next or previous printable character is a period or
a comma, it is an error.)
pointer=character_pointer+1 (point to next character)
get_pointer_character
IF pointer_character=hyphen THEN
pointer=character_pointer-1 (point to previous character)
get_pointer_character
CASE pointer_character
space: ok (rule 9)
required_return: ok (special case of rule 9)
tab: ok (special case of rule 9)
other: error
END CASE
IF previous_printable_character=period THEN error
ENDIF (rule 10)
IF previous_printable_character=comma THEN error ENDIF
(rule 10)
ELSE
pointer=character_pointer-1
get_pointer_character
IF pointer_character=hyphen THEN
pointer=character_pointer+1 (point to next character)
get_pointer_character
CASE pointer_character
space: ok (rule 9)
required_return: ok (special case of rule 9)
tab: ok (special case of rule 9)
other: error
END CASE
IF next_printable_character=period THEN error ENDIF
(rule 10)
IF next_printable_character=comma THEN error ENDIF
(rule 10)
ENDIF
END check hyphen
(7) PROCEDURE check_left_parenthesis
(When a left parenthesis is detected, the file is scanned in the
forward direction looking for a right parenthesis (12). If a left
parenthesis or the end of file is detected first, it is an error.
The next character must not be a space (13).)
pointer=character_pointer+1
get_pointer_character
CASE pointer_character
space: error (rule 13)
other: pointer=character_pointer
REPEAT
pointer=pointer+1
get_pointer_character
end=true
CASE pointer_character
left_parenthesis: error (rule 12)
right_parenthesis: ok
end_of_file: error (rule 12)
other:end=false
END CASE
UNTIL end=true
END check_left_parenthesis
(8) PROCEDURE check_left_bracket
(When a left bracket is detected, the file is scanned in the
forward direction looking for a right bracket (12). If a left
bracket or the end of file is detected first, it is an error.
The next character must not be a space (13).)
pointer=character_pointer+1
get_pointer_character
CASE pointer_character
space: error (rule 13)
other: pointer=character_pointer
REPEAT
pointer=pointer+1
get_pointer_character
end=true
CASE pointer_character
left_bracket: error (rule 12)
right_bracket: ok
end_of_file: error (rule 12)
other:end=false
END CASE
UNTIL end=true
END CASE
END check_left_bracket
(9) PROCEDURE check_right_parenthesis
(When a right parenthesis is detected, the file is scanned in the
reverse direction looking for a left parenthesis (12). If a right
parenthesis or the beginning of file is detected first, it is an
error. The previous character must not be a space (13).)
pointer=character_pointer-1
get_pointer_character
CASE pointer_character
space: error (rule 13)
other: pointer=character_pointer
REPEAT
pointer=pointer-1
get_pointer_character
end=true
CASE pointer_character
right_parenthesis: error (rule 12)
left_parenthesis: ok
beginning_of_file: error (rule 12)
other:end=false
END CASE
UNTIL end=true
END CASE
END check_right_parenthesis (10) PROCEDURE
check_right_bracket
(When a right bracket is detected, the file is scanned in the
reverse direction looking for a left bracket (12). If a right
bracket or the beginning of file is detected first, it is an
error. The previous character must not be a space (13).)
pointer=character_pointer-1
get_pointer_character
CASE pointer_character
space: error (rule 13)
other: pointer=character_pointer
REPEAT
pointer=pointer-1
get_pointer_character
end=true
CASE pointer_character
right_bracket: error (rule 12)
left_bracket: ok
end_of_file: error (rule 12)
other: end=false
END CASE
UNTIL end=true
END CASE
END check_right_bracket
(11) PROCEDURE check_colon
```

-continued (When a colon is detected, the next character must not be a
quotation mark (5) or a capital letter (3). The next character
must be either a space or a number. If the next character
is a space, then the next character must not be a capital
letter (3).)
pointer=character_pointer+1
get_character_pointer
CASE pointer_character
quotation_mark: error (rule 5)
capital_letter: error (rule 3)
number: ok
space: pointer=pointer+1
get_pointer_character
CASE pointer_character
capital_letter: error (rule 3)
other: ok
END CASE
other:ok
END CASE
END check_colon
(12) PROCEDURE count_quotes
(This procedure counts the number of quotation marks in the file.
If the number of quotation marks is odd, it is an error (12).)
pointer=beginning_of_file
REPEAT
get_pointer_character
CASE pointer_character
quotation_mark: count=count+1
other: none
pointer=pointer+1
END CASE
UNTIL pointer=end_of_file
IF count is odd THEN error ENDIF (rule 12)
END count_quotes
(13) PROCEDURE check_apostrophe
(When an apostrophe is detected, the previous character must not
be a space (14).)
pointer=character_pointer−1
get_pointer_character
IF pointer_character=space THEN error ENDIF (rule 14)
END check_apostrophe As an example of the manner in which the invention operates, consider the operation of the system in accordance with the preferred embodiment disclosed above, in checking for the proper punctuation involving a semicolon. The procedure involved is designated as (5) PROCEDURE check_semicolon. In this procedure, when a semicolon is detected (by detecting the alpha numeric code representing a semicolon) the next following characters must be a space, in accordance with rule number two, a required return (special case of rule 2) or a tab (special case of rule 2). Any other following characters indicate an error.

In this psuedo-code representation of the the procedure, the first step provides a pointer which is obtained by incrementing or increasing by the value of 1 the address of the character key currently checked. The steps "get-pointer character" will return the characters at the address of "pointer"

The character is examined for its value. If it is a space, a required returned, or a tab, the condition is valid and the sub-routine for the semicolon check is ended.

If the value of the character is not one of the three proper conditions, an error is signaled by the master microprocessor 68 and the LED 105 is flashed and an audible "beep" is sounded. The display can indicate a "semicolon error" as a specific indication of the nature of the error.

From all of the foregoing, it will be apparent to those skilled in the art that our invention provides a unique method and means for detecting and indicating punctuation errors occuring during the typing of a document, by examining the context surrounding a particular punction mark and determining if the context complies with a predetermined set of rules. The data relating to the punctuation check may be retained in specific locations in a microprocessor memory 87 as shown in FIG. 3, using the legend P, Check Data and can be called for the examination by one or more sub-routines which can be invoked by predetermined keyboard operations. Such punctuation checks can be performed concurrently with the typing of information in a memory mode, or may be carried out by subsequent finding operation in which an entire file may be sequentially examined for punctuation errors.

Errors may be indicated by visual means, such as an LED indicator light, a character display and/or an audible signal, such as a "beep" signal.

In summary the method of the present invention for checking the use of punctuation marks for use in an electronic typewriter 10 having a microprocessor 68, a read-only memory 82 and a random access memory 87, a keyboard 12 and a visual display 104, where the characters supplied from the keyboard 12 are stored in the random access memory 87, under the control of software in the read-only memory 82, includes the steps of:

(a) retrieving from the memory 87 characters representing punctuation marks, (b) retrieving from the memory 87 contextual data representing the characters located before and after the mark being currently checked, (c) determining if the contextual characters comply with rules described by a set of algorithms stored in said memory 85, (d) and informing the typist if any of the rules are violated.

The method of the present invention for checking the use of punctuation marks include the step of generating one or more alarm signals if the rules are violated.

A punctuation checking system, according to the teachings of the present invention, for use in an electronic typewriter 10 having a keyboard 12, includes a plurality of character and function keys 34, 36, 38, 40, 42 selectable for issuing unique signals: a platen 14; a carrier 18; a printing mechanism 16, 24, including a print hammer 24. supported on the carrier 18 for printing characters at selected at print positions on a recording medium 26 supported on said platen 14; a correction mechanism 32 for erasing previoulsy printed characters from the recording medium 26; bi-directional feeding means 48 for horizontally moving the carrier 18 relative to the platen 14; electronic processor means 68 for receiving the unique signals from selected keyboard keys 34, 36, 38, 40, 42 and for controlling functional operation of the typewriter mechanisms in accordance with the signals received; storage means 87 for storing characters representing punctuation marks and for storing signals representing contextual signals related to the punctuation marks and means for examining the relations between said punctuation mark signals and the the contextual signals including the electronic processor means 68, (the examining means determining if the relationships between said punctuation mark characters and said contextual signal correspond to a predetermined set of rules); and alarm means 19, 105 actuated by the electronic processor means 68 if the rules are violated. The examining means includes a plurality of algorithms, one for each of the punctuation marks to be checked and the algorithms may be stored in a read-only memory 82 associated with the electronic processor means 68 and by way of example, is effective either when the typewriter 10 is being operated in a memory mode or when said typewriter 10 is operated in a find mode, whereby an entire file 87 is sequentially examined for punctuation errors. The punctuation checking system containing the teachings of the present invention is characterized by the alarm means comprising a visual signal (104) to the typist and/or an audible signal (19) to the typist. A punctuation checking system, according to the teachings of the present invention, may include algorithms including non-printing signals and character-representing signals from said keyboard 12. A punctuation checking system in a typewriter 10, according to the teachings of the present invention, may also have a spelling error finding feature utilizing the electronic processor means 68 and the typewriter 10 may include a visual display means 104 controlled by the electronic processor means 68 for displaying a message to the typist indicating the nature of the punctuation error.

Although we have herein shown and described only one preferred embodiment of our invention, it will be apparent to those skilled in the art to which the invention appertains that various other changes and modifications may be made to the subject invention without departing from the spirit and scope thereof, and therefore it is understood that all modifications, variations and equivalents within the spirit and scope of the subject invention are herein meant to be encompassed in the appended claims.

Having thus described our invention, what we claim is:

1. A punctuation checking system for use in an electronic typewriter having a keyboard including a plurality of character and function keys selectable for issuing unique signals, a platen, a carrier, a printing machanism including a print hammer supported on said carrier for printing characters at selected print positions on a recording medium supported on said platen, a correction mechanism for erasing previously printed characters from the recording medium, bi-directional feeding means for horizontally moving the carrier relative to the platen, electronic processor means for receiving the unique signals from selected keyboard keys and for controlling functional operation of the typewriter mechanisms in acordance with the signals received, storage means for storing characters representing punctuation marks and for storing signals representing contextual signals related to punctuation marks, and means 85 for examining the relationship between said punctuation mark signals and said contextual signals including said electronic processor means, said examining means determining if the relationship between said punctuation mark characters and said contextual signals correspond to a predetermined set of rules, and alarm means actuated by said electronic processor means if said rules are violated.

2. A punctuation checking system as claimed in claim 1, further characterized by said examining means including a plurality of algorithms one for each of the punctuation marks to be checked.

3. A punctuation checking system as claimed in claim 2, further characterized by said algorithms being stored in a read-only memory associated with said electronic processor means.

4. A punctuation checking system as claimed in claim 3, further characterized by said checking system being effective when said typewriter is being operated in a memory mode.

5. A punctuation checking system as claimed in claim 3, further characterized by said checking system being effective when said typewriter is operated in a find mode, whereby an entire file is sequentially examined for punctuation errors.

6. A punctuation checking system as claimed in claim 1, further characterized by said alarm means comprising a visual signal to the typist.

7. A punctuation checking system as claimed in claim 1, further characterized by said alarm means comprising an audible signal to the typist.

8. A punctuation checking system as claim in claim 2, further characterized by said algorithms including non-printing signals and character representing signals from said keyboard.

9. A punctuation checking system as claimed in claim 1, further characterized by said typewriter also having a spelling error finding feature utilizing said electronic processor means.

10. A punctuation checking system as claimed in claim 1, further characterized by said typewriter including visual display means controlled by said electronic processor means for displaying a message to the typist indicating the nature of the punctuation error.

11. A method of checking the use of punctuation marks for use in an electronic typewriter having a microprocessor, a read-only memory and a random access memory, a keyboard and a visual display, where the characters supplied from the keyboard are stored in the random access memory, under the control of software in the read-only memory, comprising the steps of:
 (a) retrieving from the said random access memory characters representing punctuation marks,
 (b) retrieving from the said random access memory contextual data representing the characters located before and after the mark being currently checked,
 (c) determining if the contextual characters comply with rules described by a set of algorithms stored in said read-only memory,
 (d) and informing the typist if any of the rules are violated.

12. A method of checking the use of punctuation marks as claimed in claim 11, further characterized by including the step of generating one or more alarm signals if the rules are violated.

* * * * *